E. KANDLER & P. SACHSE.
SEMI-AUTOMATIC TRAY SUPPORT.
APPLICATION FILED FEB. 5, 1917.
1,272,457.
Patented July 16, 1918.
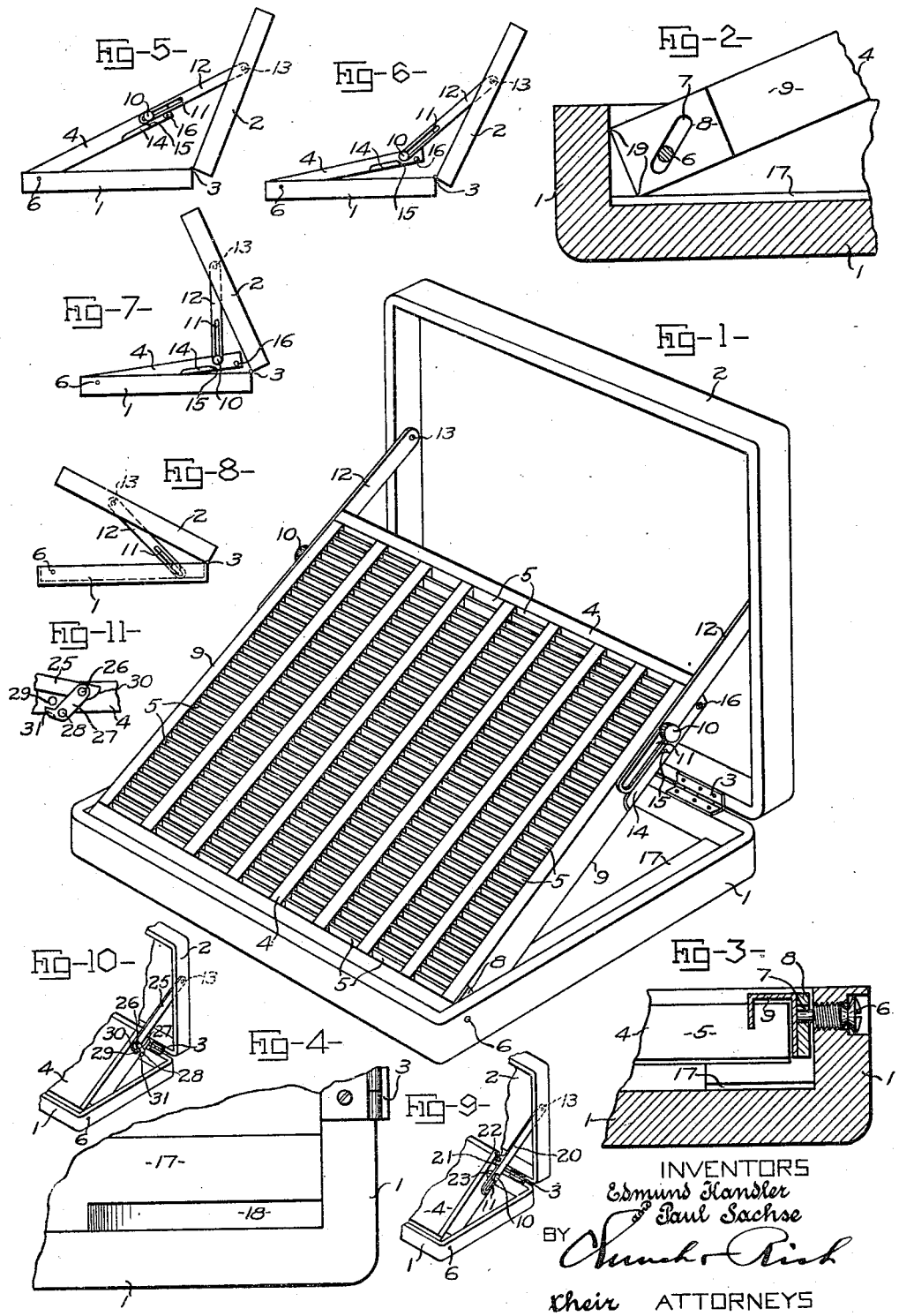
INVENTORS
Edmund Kandler
Paul Sachse
BY
Their ATTORNEYS

UNITED STATES PATENT OFFICE.

EDMUND KANDLER AND PAUL SACHSE, OF ROCHESTER, NEW YORK, ASSIGNORS TO BAUSCH & LOMB OPTICAL COMPANY, OF ROCHESTER, NEW YORK, A CORPORATION OF NEW YORK.

SEMI-AUTOMATIC TRAY-SUPPORT.

1,272,457.   Specification of Letters Patent.   Patented July 16, 1918.

Application filed February 5, 1917. Serial No. 146,640.

*To all whom it may concern:*

Be it known that we, EDMUND KANDLER, a citizen of the United States, and PAUL SACHSE, a subject of the Emperor of Germany, both residents of Rochester, county of Monroe, State of New York, have invented certain new and useful Improvements in Semi-Automatic Tray-Supports; and we do declare the following to be a full, clear, and exact description of the same, reference being had to the accompanying drawings, forming a part of this specification, and to the characters of reference marked thereon.

This invention relates generally to supports for trays normally resting in a protecting case or container and adapted for holding various articles for convenient use or for display or for other purposes. The invention more especially relates to trays used for holding the various lenses of an ophthalmic test lens set such as are employed by opticians in testing the refractive properties of a patient's eyes preparatory to fitting eye glasses or spectacles, and the invention is herein more particularly described as applied to such use.

The invention has for its object to provide a case comprising a pair of relatively openable members such as body and cover portions and containing a tray having pivotal relation with the case, and special connections between the tray and the case cover, whereby the tray may easily and semi-automatically be exposed for safe use in convenient inclined position in the opened case, and may as readily be folded down within the closed case for protecting the test lenses or other contents from dust or dirt or accidental injury when not in use.

In the drawings:

Figure 1 is a front perspective view of one preferred form of case showing a preferred style of tray in inclined position for convenient use. Fig. 2 is a fragmentary vertical sectional end elevation of front corner portions of the case and the tray. Fig. 3 is a fragmentary front vertical section taken through the axis of the tray pivots. Fig. 4 is a detail plan view of the right hand rear corner of the case bottom or body. Figs. 5 to 8 are somewhat diagrammatic smaller scale end elevations illustrating different positions assumed by the tray and connections during semi-automatic adjustment of the tray to raised and lowered positions. Fig. 9 is a fragmentary perspective view sufficiently illustrating a modification of the connecting and supporting linkage for the tray. Fig. 10 is a fragmentary perspective view illustrating another modification of the tray linkage connections. Fig. 11 is an enlarged side elevation of portions of the tray and its link connections shown in Fig. 10, but in the relative positions they assume when the tray is folded down within the closed case.

The numeral 1 indicates the case body or bottom, and 2 indicates the case cover or top which is pivoted by rear hinges 3 to the case body. The tray 4 may have any preferred general construction providing any desired number of chambers 5 in which to place test lenses or other articles which are not shown in the drawings. The preferred illustrated lens tray 4, is made mainly of sheet metal but the tray may be made of wood, celluloid, rubber or other readily cleansable material or combination of materials. At its front corners the tray 4, in a preferred construction, is pivoted to the case body 1, by pins 6, which enter inclined slot bearings 7 formed in plates 8 fixed to the opposite end frame portions 9, 9 of the tray. To the rear side part of each of these frame portions 9, is fixed a laterally projecting headed stud 10, the body portion of which may easily slide along an internal comparatively long slot 11, formed in one end portion of a link 12, the farther end of which is pivoted by a pin 13 to the tray case cover 2, at some little distance from its front edge. In front of and a little below each tray stud 10 is fixed to each tray frame portion 9 a long abutment 14, the rear upper corner of which is preferably rounded over at 15 opposite the tray stud 10. A pin 16, is provided at the rear end part of each tray portion 9 from which it projects laterally to at times form a stop to the adjacent tray link 12, as hereinafter more fully explained. At each end of the tray case body 1, is preferably fixed an interior narrow floor plate 17, the rear outer portion of which is cut away to form a corner recess 18, as more clearly shown in Fig. 4. These recesses 18, give room for play therein of the slotted end portions of the links 12, at times during opening and closing of the lens tray case.

Fig. 1 of the drawings shows that when the case is opened to permit convenient use of the test lenses then in the tray chambers 5, the lower edges of the front slotted portions of the links 12 rest upon the corresponding long upper edges of the tray abutments 14, while the tray studs 10, rest at the extreme rear ends of the slots 11 of the links 12, and then the preferred comparatively sharp upper and lower front corners 19 of the lens tray 4 rest and bind against front and floor portions of the case bottom 1, as more clearly shown in Fig. 2, which extreme front position the tray is allowed to assume by slip of the tray bearing plate slots 7 upon the pivot pins 6. The positions of the tray studs 10 and abutments 14, relatively to the links 12, and the link pivots 13 in the case cover 2, and the preferred duplex engagement at 19 of the tray front all along its width with the case body 1, assures steady and secure support of the tray in inclined position for safe use within the opened case.

To fold the tray downward within the case and close the case to protect the tray and the lenses or other articles therein, the rear edge of the tray may or may not be manually lifted slightly to relieve binding or friction at the tray studs 10, links 12, and abutments 14. The case cover 2 now is opened farther backward on its hinges 3, which moves the links 12 rearward at their slots 11, upon the tray studs 10, and along the abutments 14, say to the relative positions indicated in Fig. 5, and up to this time the slotted ends of the links 12, rest squarely on the flat top edges of the tray abutments 14, and the tray 4 still is supported by the studs, the links and the abutments. A further slight tilting of the case cover 2 to its extreme backward position causes the links 12 to move rearward and clear of the rear ends 15 of the tray abutments 14, and until the front ends of the link slots 11 engage the tray studs 10. The locking of the lens tray now is broken and as the case cover 2 is then manually swung forward toward closed position the lens tray, now supported by the studs and links alone, begins to fold downward as shown in Fig. 6. This downfolding of the tray continues as the case cover farther closes and while the links 12 assume the approximately vertical position shown in Fig. 7. As the tray flatly seats itself upon the case bottom floor plates 17, the links 12 assume forwardly inclined positions shown in Fig. 8, and while the case cover 2 is being fully closed, the slots 11 of the links 12 slide rearward on the tray studs 10, as the link ends ride into and along the floor plate slots 18. During the downfolding of the lens tray 4 and the closing of the tray case thereon as above described, the tray pins 16 have no specially useful function.

To open the closed case and simultaneously adjust the lens tray into the inclined useful position shown in Fig. 1, it is only necessary to swing the case cover 2 upward and backward on its hinges 3, thereby causing the cover 2 and the lens tray 4 to assume successive relative positions shown in respective Figs. 8, 7, 6, of the drawings. The tray now is manually lifted farther at its rear edge until the links 12 strike the tray stop pins 16, when the lower edges of the links will be raised clear above the upper edges of the tray abutments 14. The case cover 2 now is swung forward on its hinges 3, thereby causing the links 12 to ride on the tray studs 10 and over the tray abutments 14 to the respective positions shown in Fig. 5 to begin the locking of the tray. A farther continued forward swing of the case cover 2 moves the link connections of the tray to final positions wherein the raised tray will be fully and securely locked, as shown in Fig. 1 by coaction of the links 12 with the tray studs 10 and abutments 14, with the tray front snugly fitting at 19, into front portions of the case body 1 as hereinabove described, and the whole case and tray structure has a most befitting and pleasing appearance while the tray is in use.

The stop pins 16 are used more for convenience than necessity and may be dispensed with, but these pins, by limiting manual lifting of the lens tray when setting it up for use, serve to more quickly and certainly adjust the links 12 and abutments 14 into proper relative positions for their final full interlocking engagement to support the tray.

It is possible to use heavier or stronger stud, link and abutment connections 10, 12, 14, at one end only of the lens tray and case, but the use of these coacting parts at both ends thereof, as herein shown and described, is preferred in practice.

Should the front frame bar of the lens tray have a half round front edge instead of square corners 19, the inclined slots 7 in the pivot bearing plates 8 may be substituted by round holes in which the pivot pins 6 fit closely. The use of the slot bearings 7 with the pivot pins 6 is preferred because these bearings allow the raised lens tray to automatically brace itself firmly all along the front by its substantially square corners 19 impinging on the case, and the slot bearings also allow the lowered lens tray to lie for its whole width flat upon the case floor plates 17, hence whether the tray be raised or lowered its pivots 6 are subject to little or no breaking strains and the tray itself is not liable to injurious racking strains. It is not essential that the lens tray be positively pivoted to the case body by the pins 6 in the now preferred manner, as it is obvious that the tray front may lie loosely and self-adjustingly within the case body and then would have every necessary pivotal connection therewith to assure secure locking of the tray by the stud, link and abutment connections coacting with the front engagement of the tray with the case. The lens tray may be pivoted to the case otherwise than at or along the front or one side, within the scope of this invention.

In the modification sufficiently shown in Fig. 9, the tray 4 has a fixed stud 10 passing through the slot 11 of a link 20 which is pivoted at 13 to the case cover 2. At its inner face the link 20 has a lug 21 adapted to coact with a fixed pin abutment 22 projecting laterally from the end portion of the tray 4 at a higher level than the stud 10. A spacing bushing 23 slightly longer than the height of the link lug 21, is placed on the stud 10 between the link 20 and the tray. The link slot 11 has sufficient length to allow reverse longitudinal movements of the link 20, due to swinging of the case cover 2 on its hinges 3, to permit engagement of the tray pin 22 above the link lug 21, or to be clear of said lug. When the case cover 2 is adjusted to position for use shown in Fig. 9, the tray abutment 22 overlies the link lug 21, and thus coacts with the stud 10 and the link in supporting and locking the tray 4 in raised inclined position. To fold the tray downward the case cover 2 is opened a little farther backward to allow the link lug 21 to pass rearward from under the tray abutment 22, and the now unlocked tray will automatically fold downward as its stud 10 slides in and is supported at the link slot 11, and during its final downfolding movement the link 20 assumes a forwardly inclined position until the cover 2 fully shuts to protectively inclose the tray within the case. To again raise the tray into position for use the case cover 2 is opened on its hinges 3, farther backward than is shown in Fig. 9, as the tray 4 is supported by its stud 10 resting at the forward lower end of the link slot 11, and after the tray is manually raised at its rear edge to carry its pin abutment 22 around in front of the link lug 21 and slightly above the level of this lug, the case cover 2 will be swung forward a little on its hinges 3, to carry the link lug 21 under the tray abutment 22 as the rear end of the link slot 11 strikes the tray stud 10, when the tray will again be securely locked in raised inclined position.

In the modification sufficiently shown in Figs. 10 and 11, an unslotted main link 25 pivoted at one end by a pin 13 to the case cover 2 is pivoted at its other end, by a pin 26, to one end of a short auxiliary link 27 the other end of which is pivoted by a pin 28 to the end frame portion of the tray 4 which is pivoted at 6 to the tray body 1. A fixed pin abutment 29 projecting laterally from the tray frame is adapted for engagement by the forward end 30 of the main link 25 which at times projects in front of the auxiliary link 27, and the abutment 29 also may at times be engaged by a forwardly projecting hook or lug 31 preferably formed on or fixed to the lower end of the shorter link 27. When the case cover 2 is opened and the tray 4 is raised for use as shown in Fig. 10, the front end 30 of the main link 25 rests and binds on top of the pin abutment 29 against which the auxiliary link 27 also preferably rests, and the tray 4 thus is held and securely locked in raised position by coaction of the linkage and abutment to facilitate convenient access to the lenses or other contents of the tray. To close the open case and simultaneously fold the tray 4 downward therein, the case cover 2 will be swung backward a little on its hinges 3 to carry the end 30 of the main link 25 clear of the tray abutment 29, when the tray now unlocked at once folds downward as the rounded edge of the link end 30 rides on the rear face of the abutment 29 while the auxiliary link 27 rests against the abutment and then the main link moves forward past alinement with the auxiliary link 27. As the tray 4 folds fully downward upon the case body floor, the main link 25 swings the auxiliary link 27 backward a little from the tray abutment 29 and the downfolded tray 4 and the links 25, 27 assume positions approximately as shown in Fig. 11 of the drawings. When the case next is opened to raise the tray 4, the main link 25 first moves the auxiliary link 27 to the abutment 29 and the tray then begins to rise on its pivots 6. As the main link 25 approaches alinement with the auxiliary link 27 and swings farther backward past alinement therewith, the link 27 again swings away from the tray abutment 29 and the lug 31 of the link 27 rests against the abutment 29 to limit backward movement of this link, and after the case cover 2 is swung backward as far as the linkage will allow, the rear portion of the tray is manually lifted until the end 30 of the main link 25 rises above the level of the tray abutment 29, and the case cover 2 now is swung forward sufficiently to carry the main link end 30 over the abutment 29 as the auxiliary link 27 strikes this abutment, and the tray 4 again is securely locked in fully raised inclined position shown in Fig. 10 of the drawings.

Having thus described our invention, what we claim and desire to secure by Letters Patent of the United States is:

1. The combination with two relatively hinged members and a tray having a tilting movement relatively to one of them, of a link connecting the other member and the tray secured to one of said parts by a fixed pivot and to the other by a sliding pivot, and means for locking the link against pivotal movement arranged for coöperation with the link by a sliding movement of the latter as the hinged members are moved relatively.

2. The combination with two relatively hinged members and a tray having a tilting movement relatively to one of them, of a link connecting the other member and the tray secured to one of said parts by a fixed pivot and to the other by a sliding pivot and locking means for holding the link against pivotal movement about the sliding pivot, the link being adapted to swing about the sliding pivot while the hinged members are moved apart and being adapted to slide along said pivot into engagement with the locking means while said hinged members are moved toward one another.

3. In a semi-automatic tray support, the combination with a pair of relatively openable members, and a tray having pivotal relation with one of the members, of a link pivotally connected at one end to the other member and having its other end connected to the tray to be pivotally and longitudinally movable relatively thereto, and an abutment on the tray adapted when the link is moved longitudinally in one direction to support the tray by intercepting the pivotal movement of the link relatively thereto, and adapted when the link is moved longitudinally in the other direction to be out of the path of pivotal movement of the link while the tray is lowered.

4. In a semi-automatic tray support, the combination with a pair of relatively openable members, and a tray having pivotal relation with one of the members, of a stud on the tray, a link slotted at one end and engaging the tray stud at said slot, and pivotally and longitudinally movable relatively to the tray, and an abutment on the tray adapted when the link is moved longitudinally in one direction to support the tray by intercepting the pivotal movement of the link relatively thereto, and adapted when the link is moved longitudinally in the other direction to be out of the path of pivotal movement of the link while the tray is lowered.

5. In a semi-automatic tray support, the combination with a pair of relatively openable members, and a tray having pivotal relation with one of the members, of a stud on the tray, a link having at one end an elongated slot engaging the stud and thus being pivotally and longitudinally movable relatively to the tray, and an elongated abutment on the tray in front of said stud and at a different level and adapted when the link is moved longitudinally in one direction to support the tray by intercepting the pivotal movement of the link relatively thereto, and adapted when the link is moved longitudinally in the other direction to be out of the path of pivotal movement of the link while the tray is lowered.

6. In a semi-automatic tray support, the combination with a case comprising hinged body and cover portions, of a tray having yielding pivotal relation with the case body and also having a laterally projecting stud, a link pivoted at one end to the case cover and having at its opposite end portion an elongated slot entered by the tray stud, and an elongated abutment on the tray in front of said stud and at a different level and adapted when the link is moved longitudinally by the case cover in one direction to support the raised tray by intercepting the pivotal movement of the link relatively thereto, and adapted when the link is moved longitudinally by the case cover in the other direction to be out of the path of pivotal movement of the link while the tray is lowered, said tray when raised bracing itself firmly at the case body front and when lowered lying flat upon the case body floor to relieve the tray and its pivots from injurious strains.

EDMUND KANDLER.
PAUL SACHSE.

Copies of this patent may be obtained for five cents each, by addressing the "Commissioner of Patents, Washington, D. C."